United States Patent [19]
Dashner

[11] 3,945,607
[45] Mar. 23, 1976

[54] PRESSURE SAFETY VALVE
[75] Inventor: James W. Dashner, Charlotte, N.C.
[73] Assignee: Consolidated Brass Company, Matthews, N.C.
[22] Filed: Nov. 8, 1974
[21] Appl. No.: 521,975

[52] U.S. Cl. .............. 251/357; 251/360; 251/362; 251/368; 137/540; 137/542; 137/543.15
[51] Int. Cl.² .......................................... F16K 1/34
[58] Field of Search ........... 264/230, 229; 251/362, 251/360, 357, 368, 358; 137/540, 542, 543.15

[56] References Cited
UNITED STATES PATENTS

| | | | |
|---|---|---|---|
| 2,117,044 | 5/1938 | Spence | 251/360 |
| 2,601,563 | 6/1952 | Selwyn | 137/540 |
| 2,666,448 | 1/1954 | Garretson et al. | 137/540 |
| 2,815,040 | 12/1957 | Smith | 251/360 |
| 2,961,214 | 11/1960 | Freed | 251/368 |
| 3,382,894 | 5/1968 | Shurtleff et al. | 251/368 |

FOREIGN PATENTS OR APPLICATIONS 1,217,829  5/1960  France ............................... 137/540

Primary Examiner—William R. Cline
Assistant Examiner—H. Jay Spiegel
Attorney, Agent, or Firm—Richards, Shefte & Pinckney

[57] ABSTRACT

A safety valve for use in gaseous service at elevated temperatures, including a casing provided with an annular valve seat and a selectively moveable valve member having mounted thereon a plastic annular sealing ring for seating on the valve seat. The plastic annular sealing ring is preferably formed of Teflon P.F.A. fluorocarbon and is shrunk fit onto a projecting shoulder portion of a metal seal retainer detachably mounted on the valve member, and the valve seat includes a projecting ridge formed by intersecting flat surface portions disposed at an obtuse angle to one another, whereby the plastic annular sealing ring will be engaged by the valve seat ridge when the valve member is seated.

9 Claims, 7 Drawing Figures

PRESSURE SAFETY VALVE

BACKGROUND OF THE INVENTION

Safety valves utilized in fluid systems where the temperature of the fluid is not significantly high commonly employ a valve sealing surface or ring formed of a soft material such as rubber or plastic because such material provides a pliable mating surface which forms a tight seal, a valve of this type being disclosed for example in U.S. Pat. No. 3,623,699, issued Nov. 30, 1971, to Matousek. However, where safety valves are placed in a fluid system in which the temperature of the fluid is substantially raised, the use of such soft materials at the mating surfaces of these valves has been virtually non-existent because such materials have an extremely high coefficient of expansion which cause it to "flow" and become distorted when exposed to the high temperature fluid in the system, whereby the mating surfaces of the valve do not seat properly. As a result, substantially all high temperature safety valves currently employ metal-to-metal mating surfaces, but valves having metal-to-metal mating surfaces present additional problems in that they are expensive to produce because of the extremely close tolerances which require lapping to obtain the necessary flatness to form an adequate seal at the mating surfaces, and in that even with precision lapping there is a likelihood of some leakage at the mating surfaces particularly when small foreign particles become entrapped between the smooth seating surfaces of the valve and cause marring thereof as a result of the slight lateral movement of the surfaces with respect to one another during seating and unseating of the valve member.

In an attempt to overcome the above-discussed problems, it has been heretofore proposed in U.S. Pat. No. 2,641,278, issued June 9, 1953, to Eplett et al., to provide a molded valve member which is formed entirely of nylon, and which is unconfined peripherally so as to permit the radial expansion of the valve member caused by the temperature of the fluid and the very high coefficient of expansion of nylon. Because the valve member is made entirely of nylon, the substantial expansion of the valve member would make it prohibitive in many high temperature systems, and the patent itself suggests that the valve would not be effective in systems where the fluid temperature exceeds 300°F.

The present invention provides a safety valve which avoids the aforementioned drawbacks of conventional safety valves, and which operates substantially without leakage, even after use, in fluid systems at elevated temperatures.

Summary of the Invention

In accordance with the present invention, a safety valve is provided which includes a casing formed with a valve seat, and a selectively moveable valve member having a seal retainer with a projecting shoulder portion about which an annular plastic sealing ring is mounted by a shrink fit. Since the annular plastic sealing ring is mounted on the seal retainer of the valve member with a shrink fit, the plastic seal material has a tensile stress imposed thereon, and when the plastic sealing ring is exposed to heat, the heat acts principally to neutralize this tensile stress rather than to cause undesirable expansion of the radial dimension of the sealing ring which would result in buckling, and seat misalignment, and corresponding leakage of the valve seat.

Preferably, the annular sealing ring is shrunk fit onto a generally cylindrical seal retainer made of metal which can be attached and detached from the valve member and has an annular lip projecting radially over the inner edge of the sealing ring to retain it in place, with the lip spaced from the base of the valve member a distance approximately equal to the corresponding thickness of the sealing ring to avoid any buckling of the sealing ring by the lip. Also preferably, the valve seat is formed with an end face provided with a projecting ridge which contacts the annular sealing ring when the valve member is seated. This projecting ridge is, in accordance with the present invention, formed by flat surfaces intersecting at a substantial angle to one another so as to present a projecting ridge which will engage the relatively soft annular sealing ring and form a tight seal, yet which is flat enough to avoid wire drawing thereat as fluid passes thereover upon functioning of the safety valve. It has been found that surfaces having an angle of intersection of approximately 150 degrees will provide an ideal projecting ridge for the valve seat. For the obtuse angle to be effective in avoiding wire drawing, the ridge is preferably spaced from the edges of the valve seat so that there will be an adequate extent of the flat surfaces between the edges and the ridge.

There are a number of plastic materials from which the annular sealing ring of the present invention could be made, depending generally upon the temperature of the fluid to which the annular ring is exposed, but Teflon P.F.A. fluorocarbon has been found to give particularly good results at elevated temperatures.

Description of the Preferred Embodiment

Figure 1:
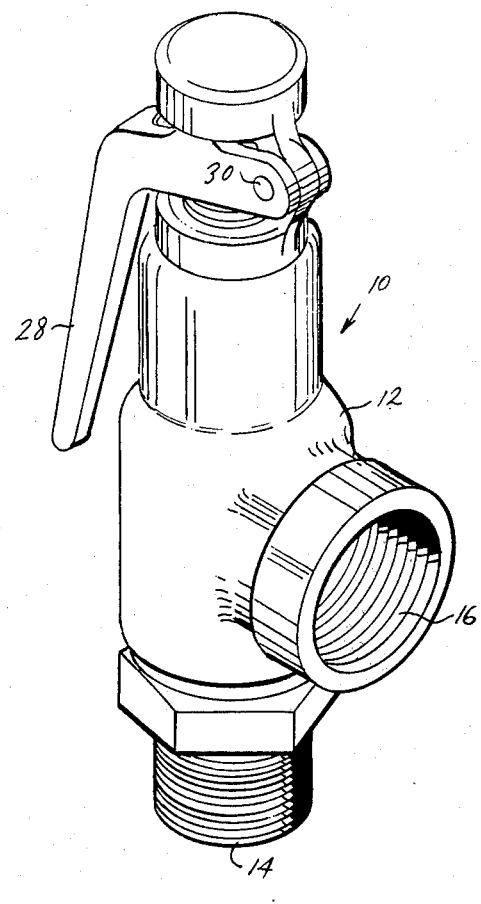
FIG. 1 is a perspective view of the safety valve of the present invention.

Looking now in greater detail at the accompanying drawings, FIGS. 1–4 illustrate a safety valve 10 including a conventional casing 12 made of any suitable material such as metal, the casing 12 being provided with a threaded inlet 14 which permits the safety valve 10 to be fitted into an elevated temperature system to provide over pressure protection, and an outlet 16 through which gas is exhausted when the safety valve 10 is at its open position. The upper portion of the casing 12 has fitted therein a stationary sleeve member 18 in which a valve stem 20 is slideably carried for longitudinal movement within the casing 12. The upper end of the valve stem 20 has a cap element 22 fixed thereto, the cap element 22 including a flange 24 arranged for abutment with a projection 26 formed on a test lever 28 mounted for pivotal movement about a pivot rod 30 fixed to the casing 12. The test lever 28 may be manually pivoted upwardly (see FIG. 4) to raise the valve stem 20 for testing the operation of the safety valve 10 in a conventional manner, although the valve stem 20 moves up and down independently of the test lever 28 during normal operations of the safety valve 10.

Figure 3:
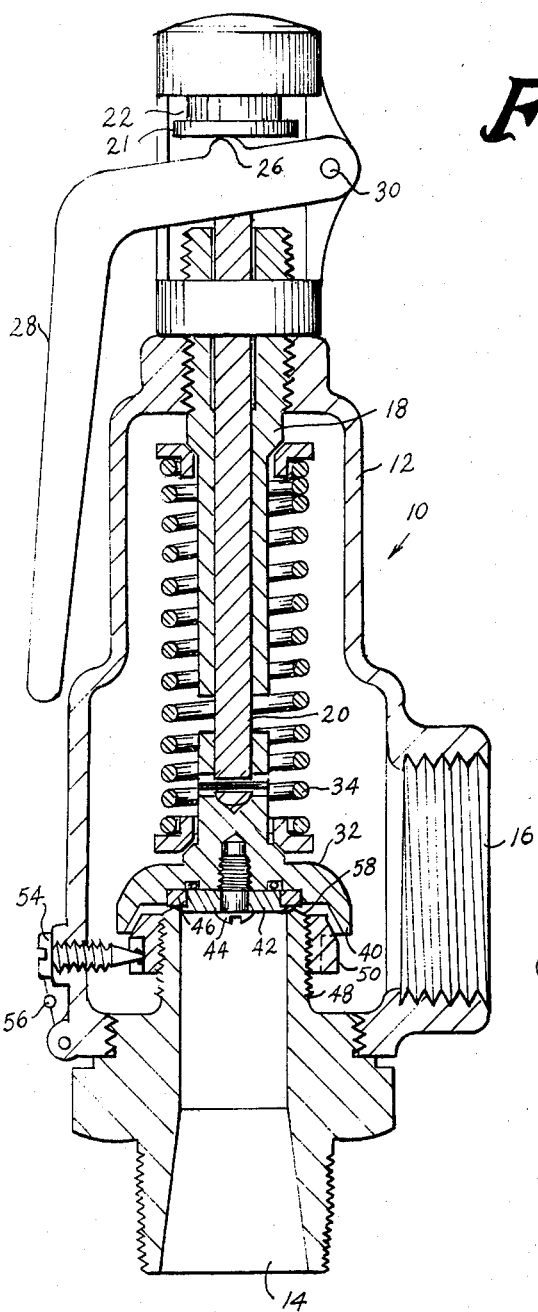
FIG. 3 is a side elevational view taken through the center of the safety valve shown in FIG. 1, illustrating the valve member at its closed, or seated, position.
Figure 4:
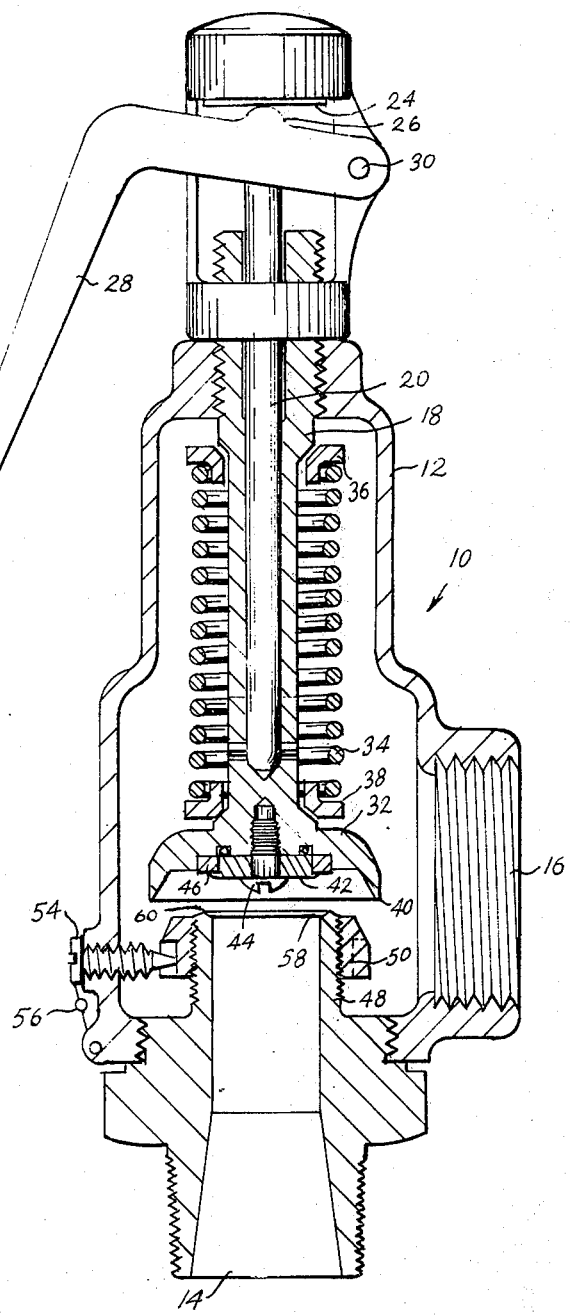
FIG. 4 is a side elevational view corresponding to FIG. 3 and illustrating the valve member at its open position.
Figure 6:
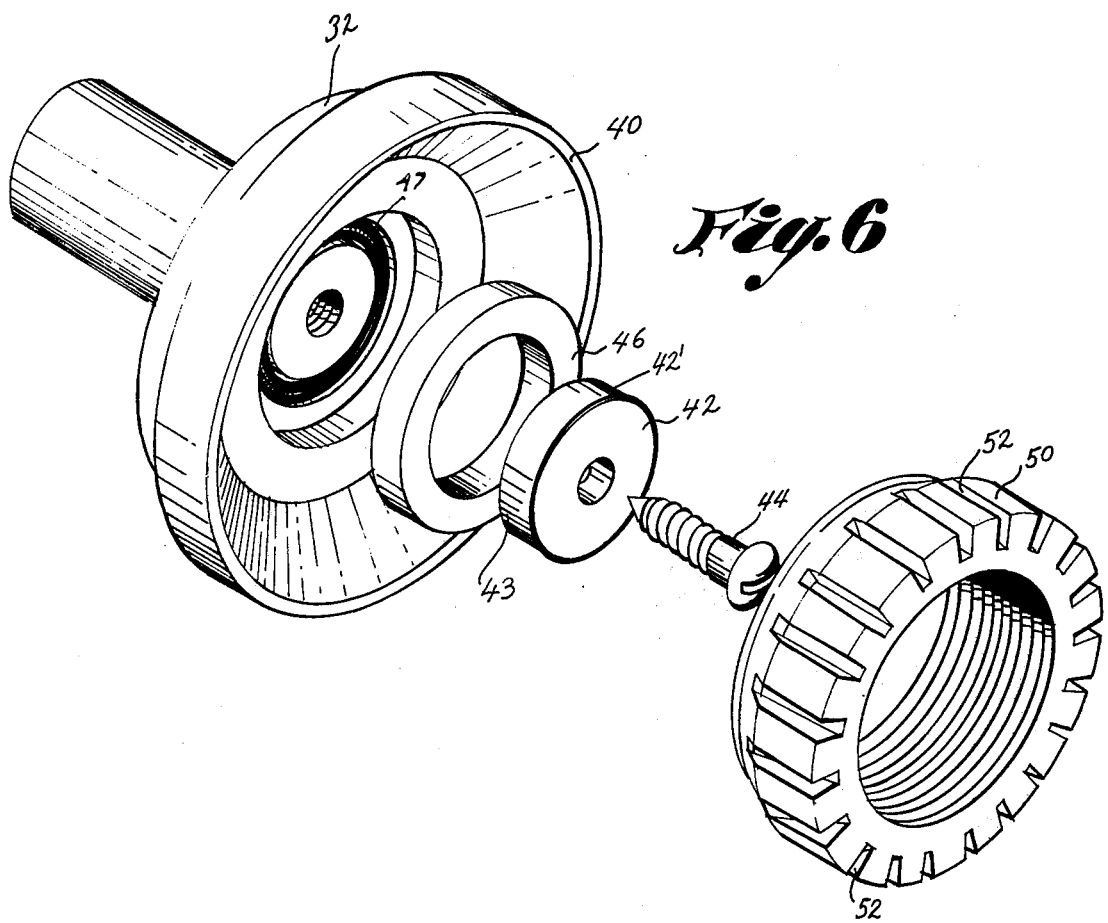
FIG. 6 is an exploded view of the valve member.

A valve member 32, preferably made from a metal such as brass, is secured to the lower end of the valve stem 20, and this valve member 32 is urged downwardly by a spring 34 bearing against a pair of spring buttons 36 and 38 which are disposed in abutment with the fixed sleeve 18 and the valve member 32, respectively. The valve member 32 is formed with an extending flange portion 40, and a seal retainer 42 projects from the bottom face of the valve member 32 and is detachably held in place thereat by the threaded screw 44, the projecting retainer shoulder 42 being preferably formed of metal, such as brass, and having a cylindrical peripheral surface or shoulder 43 about which an annular sealing ring 46 is mounted with a shrink fit as will be discussed in greater detail below. An O-ring 47 is located between the seal retainer 42 and the valve member 32 to prevent leakage therebetween. Thus, as seen in FIGS. 3 and 4, the sealing ring 46 is mounted in the valve member 32 in a seal retaining compartment having a bottom surface and two parallel side surfaces, one being the cylindrical surface 43, all of which are in abutment with the sealing ring 46 to contain it on three sides thereof.

Figure 2:
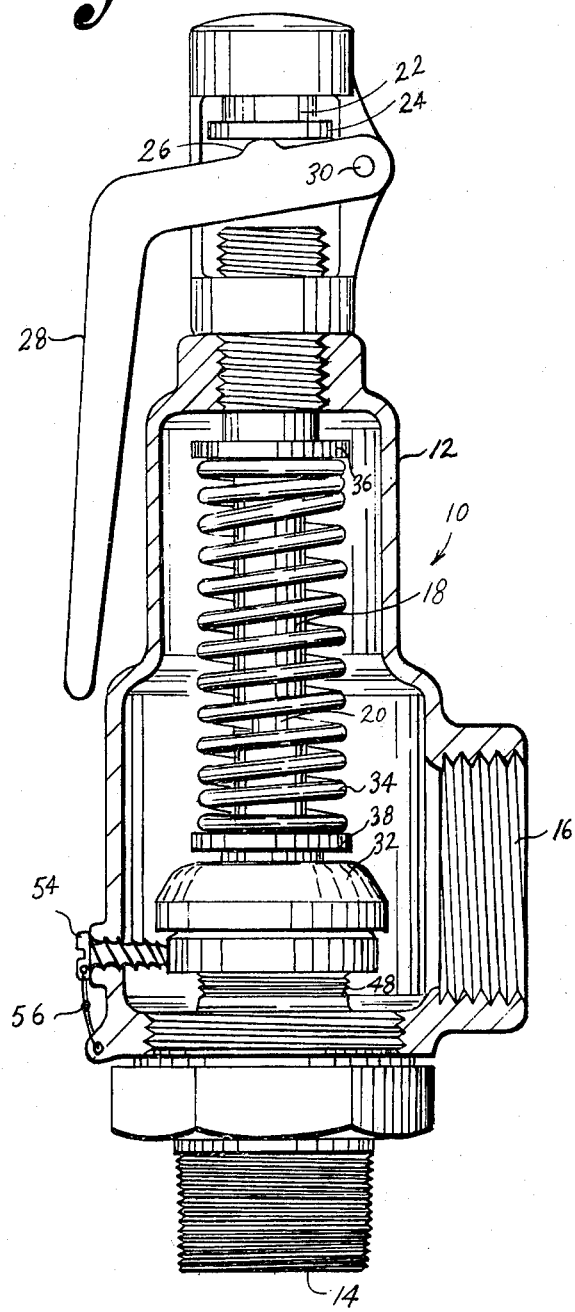
FIG. 2 is a side elevational view, partly cut away, of the safety valve shown in FIG. 1.
Figure 5:
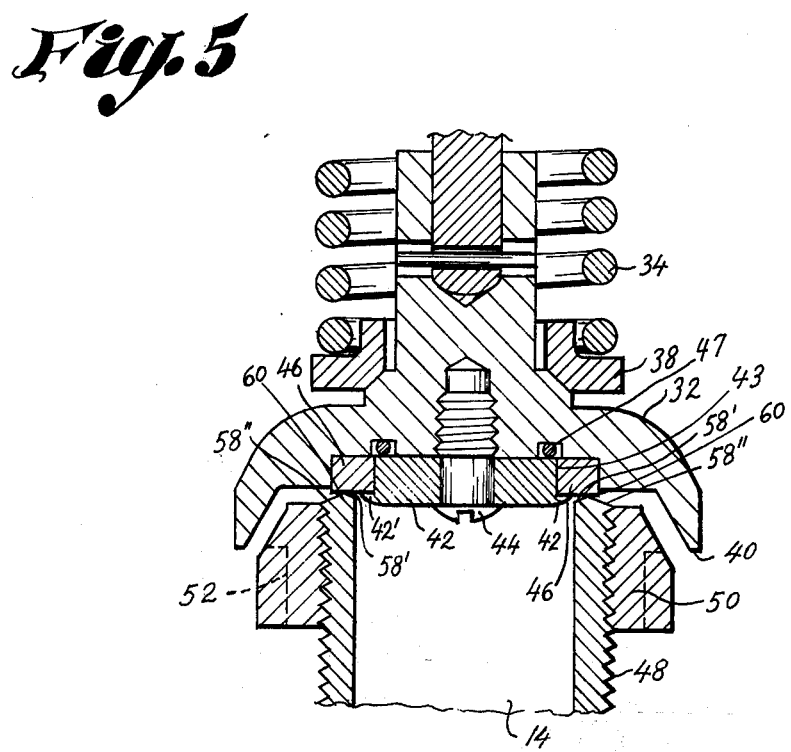
FIG. 5 is a detail view illustrating the valve seat and the lower portion of the valve member.

The lower portion of the valve casing 12 includes an upwardly extending nozzle 48 forming part of the inlet 14, and a blow down ring 50 is threadably received about the periphery of the nozzle 48 and cooperates with the valve member 32 and valve seat 46 to control the blow down characteristics of the safety valve 10 in accordance with specified requirements. Once the blow down ring 50 is properly adjusted to meet such specified requirements, it is necessary to maintain this adjustment, and the blow ring 50 may therefore be formed with a plurality of flutes 52 which can be engaged by a lock screw 54 extending through the valve casing 12 to thereby prevent rotation of the blow down ring 50. A thin wire seal 56 may extend from the lock screw 54 to the valve casing 12 to indicate, when the wire seal 56 is intact, that the lock screw 54 has not been tampered with. The upper surface of the nozzle 48 forms an annular valve seat 58 which abuts the annular sealing ring 46 when the valve member 32 is seated as illustrated in FIGS. 2 and 5, to thereby close and seal the inlet 14.

The annular sealing ring 46 is formed of a relatively soft plastic material which will depress slightly when it abuts the valve seat 58 to form a tight seal thereby overcoming the previously discussed disadvantages associated with metal-to-metal contact at the valve seat. As has also been previously discussed, the use of plastic material for the contact surfaces of valves used in elevated temperature systems has heretofore been impractical because of the high coefficient of expansion of plastic material (approximately ten times higher than the coefficient of expansion of metal), which causes serious buckling or other deformation of the plastic material and thereby adversely affects its sealing capability. In particular, if a conventional plastic annular sealing ring is mounted at its exterior surface and exposed to heat, the expansion of the exterior diameter of the ring against its mounting can cause buckling or similar serious deformation. Moreover, if such a conventional sealing ring is mounted at its interior diameter, expansion of the sealing ring when heat is applied thereto will cause significant enlargement of the interior diameter so that the sealing ring may separate from its mounting and become loose. However, such drawbacks have been substantially eliminated in the present invention by shrink fitting the plastic annular sealing ring 46 onto the cylindrical seal retainer shoulder 43, thereby setting up internal tensile stresses in the plastic annular sealing ring 46.

Thus, by way of example, if the seal retainer shoulder 43 has an exterior diameter of 0.620 inches, a plastic annular sealing ring 46 having an interior diameter at its center opening of 0.600 inches at ambient temperature is used. This plastic annular sealing ring 46 is then heated to a sufficiently high temperature (e.g., 500°F.) to cause it to expand until its interior diameter is greater than 0.620 inches, whereupon it is mounted about the seal retainer 42 and allowed to cool. As the plastic annular sealing ring 46 cools, it tends to contract, but it cannot because of the presence of the seal retainer 42, and the result is that when the annular sealing ring 46 cools to ambient temperature, it is securely mounted on the seal retainer 42 with a shrink fit and it has imposed upon it the aforementioned internal tensile stresses. The seal retainer 42, which supports the plastic annular sealing ring 46, is then attached to the valve member 32 by the screw 44, and when the safety valve 10 is then placed in an elevated temperature gas system the temperature of the fluid to which the plastic annular sealing ring 46 is exposed acts principally to release the internal stresses of the plastic annular sealing ring 46 rather than to cause undesirable expansion or deformation thereof, as discussed previously. Accordingly, even at high temperatures below the shrink fit temperature, the plastic annular sealing ring 46 maintains its shape and provides an excellent seal with the valve seat 58. Finally, it is to be noted that, heretofore, a problem has been encountered in mounting plastic annular sealing rings securely in place on a valve member because the inherent resiliency of the material makes it difficult to retain in place without undesirably compressing the material. This difficulty is overcome in the present invention by virtue of the fact that the annular sealing ring 46 is securely mounted on the seal retainer shoulder 43 with a shrink fit, and the metal seal retainer 42 can then be tightly secured to the metal valve member 32 with a screw 44 or the like. To assist in retaining the annular sealing ring 46 on the seal retainer 42, particularly when the sealing ring 46 is heated, the seal retainer 42 is formed with an annular lip 42' projecting radially over the inner edge of the annular sealing ring 46 (see FIG. 5) where it cannot slide off of the seal retainer shoulder 43. The projecting extent of the seal retainer shoulder 42 from the valve member 32 to the lip 42' is at least equivalent to the corresponding thickness of the annular sealing ring 46 so as to assure that the lip 42' will not press against or buckle the annular sealing ring 46 even when the seal retainer 42 is secured flush against the valve member 32 by the screw 44.

There are a variety of plastic materials which can be used in making the annular sealing ring 46, such as Lexan and nylon for example, where the temperature of the gas to which the material will be exposed in service is low, and where the material is able to withstand deformation at such temperature after the plastic annular sealing ring 46 has been mounted on the seal retainer 42 as described above. However, it has been found that in gaseous systems, at elevated temperatures, exceptionally good results are obtained if the plastic annular sealing ring 46 is formed of Teflon P.F.A. fluorocarbon because of its stability at these elevated temperatures. For example, in a gas system where saturated steam at 200 p.s.i. is used, the temperature of the steam is approximately 400°F. and a sealing ring 46 made of Teflon P.F.A. fluorocarbon performs well even at this elevated gas temperature. To mount an annular sealing ring 46 made of Teflon P.F.A. fluorocarbon on the seal retainer 42, the sealing ring 46 is usually pre-heated to a temperature of about 500°F.

Figure 7:
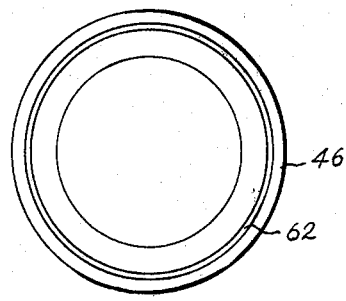
FIG. 7 is a bottom view of the plastic annular sealing ring.

To further improve the sealing capabilities of the safety valve 10 of the present invention, the valve seat 58 is formed with a special surface configuration which cooperates exceptionally well with the plastic annular sealing ring 46. As best seen in FIG. 5, the valve seat 58, which is generally annular, is formed by two flat surfaces 58', 58'' intersecting one another at an obtuse angle in excess of 90 degrees, preferably at an angle of 150°, so as to form a projecting ridge 60 located between and spaced from the edges of the annular valve seat 58 and arranged to contact the plastic annular sealing ring 46 when the valve member 32 is seated on the valve seat 58. By virtue of the wide angle between the intersecting surface 58', 58'' and the location of the ridge 60 between the edges of the annular valve seat 58, the ridge 60 is prominent enough to readily cause a slight depression of the plastic annular sealing ring 46 whereby a tight seal is formed therewith, yet the ridge 60 is not sharp enough to penetrate the plastic annular sealing ring 46 so as to cause tearing or cutting thereof, nor is it sharp enough to create any significant problem of wire drawing when elevated temperature, high pressure gas passes thereover upon opening of the valve member 32 (FIG. 4). In the latter regard, where a sharp edge is formed at a valve seat, as for example where the intersecting surfaces forming the edge be at an angle of 90° or less, there is less metal material contained between the intersecting surface and elevated temperature, high pressure gas flowing thereacross can cause enough pitting or erosion of this metal material to adversely affect its sealing relationship with the plastic annular sealing ring 46. Finally, it is to be noted that the projecting ridge 60 will, after a period of use, form a shallow annular depression 62 in the plastic annular sealing ring 46 as illustrated in FIG. 7 whereby the coaction of projecting ridge 60 and the shallow depression 62 will render the valve member 32 largely self-centering.

The safety valve 10 described above is used in gas systems at elevated temperatures, but it is to be understood that the present invention is also equally applicable to safety relief valves used in liquid systems at elevated temperatures.

The present invention has been described in detail above for purposes of illustration only and is not intended to be limited by this description or otherwise to exclude any variation or equivalent arrangement that would be apparent from, or reasonably suggested by, the foregoing disclosure to the skill of the art.

I claim:

1. A blow-down safety valve for use with elevated temperature fluid systems, and the like, said valve including a casing formed with an annular valve seat having two flat surfaces intersecting one another to form a projecting edge, and a valve member selectively movable to a position seated on said valve seat, said valve member including a seal retaining compartment having a bottom surface and two parallel side surfaces extending generally perpendicularly from said bottom surface, and an annular plastic ring mounted in said seal retaining compartment for abutment with said bottom and side surfaces thereof with the remaining surface of said plastic ring being positioned to contact said valve seat projecting edge, said plastic ring being pre-stressed to a condition whereby the areas of contact between said plastic ring and said projecting edge remain substantially constant with respect to one another to predetermined elevated fluid temperatures.

2. A safety valve as defined in claim 1 and further characterized in that said valve member includes a detachable seal retainer member having a projecting shoulder forming one of said parallel side surfaces of said seal retainer compartment, and in that said plastic ring is mounted on said seal retainer projecting shoulder with a shrink fit.

3. A safety valve as defined in claim 2 and further characterized in that said seal retainer projecting shoulder portion is formed with an annular lip projecting radially over the inner edge of the annular sealing ring to retain said ring on said seal retainer shoulder portion.

4. A safety valve as defined in claim 3 and characterized further in that the projecting extent of said seal retainer shoulder portion to said lip is at least equivalent to the corresponding thickness of said sealing ring to avoid buckling of the ring by the lip.

5. A safety valve as defined in claim 2 and further characterized in that said annular plastic ring is supported on said valve member solely by its shrink fit mounting on said projecting shoulder portion of said detachable seal retainer.

6. A safety valve as defined in claim 1 and characterized further in that said projecting ridge is between and spaced from the edges of said annular valve seat.

7. A safety valve as defined in claim 1 and further characterized in that said projecting ridge of said valve seat end face is formed by two flat surface portions intersecting one another at an obtuse angle substantially in excess of 90°.

8. A safety valve as defined in claim 7 and further characterized in that said two flat surface portions intersect one another at an angle of approximately 150°.

9. A safety valve as defined in claim 1 and further characterized in that said annular plastic ring is formed of Teflon P.F.A. fluorocarbon.

* * * * *